US009582616B2

(12) United States Patent
Carrera et al.

(10) Patent No.: US 9,582,616 B2
(45) Date of Patent: Feb. 28, 2017

(54) METHOD FOR REPRESENTING AND GENERATING A FLAT PATTERN FOR A COMPOSITE PLY THAT FOLDS OVER ITSELF

(71) Applicant: Siemens Product Lifecycle Management Software Inc., Plano, TX (US)

(72) Inventors: Julio Cesar Carrera, Newton, MA (US); Jonathan T. Moran, Framingham, MA (US)

(73) Assignee: SIEMENS PRODUCT LIFECYCLE MANAGEMENT SOFTWARE INC., Plano, TX (US)

(*) Notice: Subject to any disclaimer, the term of this patent is extended or adjusted under 35 U.S.C. 154(b) by 156 days.

(21) Appl. No.: 14/604,375

(22) Filed: Jan. 23, 2015

(65) Prior Publication Data

US 2016/0217220 A1     Jul. 28, 2016

(51) Int. Cl.
    *G06F 17/50*     (2006.01)
    *B29C 61/10*     (2006.01)
    (Continued)

(52) U.S. Cl.
CPC .............. *G06F 17/50* (2013.01); *B29C 61/10* (2013.01); *B29C 70/30* (2013.01); *B29C 70/345* (2013.01); *G06F 2217/06* (2013.01); *G06F 2217/12* (2013.01); *G06F 2217/42* (2013.01); *G06F 2217/44* (2013.01); *G06T 17/00* (2013.01); *G06T 19/00* (2013.01)

(58) Field of Classification Search
CPC .. G06F 2217/44; G06F 2217/42; B29C 61/10
See application file for complete search history.

(56) References Cited

U.S. PATENT DOCUMENTS 3,410,742 A * 11/1968 Anderberg ............. A41D 27/24
                                                        112/440
4,849,913 A * 7/1989 Ward ................. G05B 19/4097
                                                        156/264

(Continued)

FOREIGN PATENT DOCUMENTS

EP          1050396 A1     11/2000
WO    2011149767 A1     12/2011

OTHER PUBLICATIONS

PCT/US2016/014416 Search report.*

(Continued)

*Primary Examiner* — Akash Saxena

(57) ABSTRACT

Methods for generating a flat pattern for a composite ply. A method includes receiving a tool model and a ply coverage, wherein the ply coverage defines a plurality of plies, a fiber orientation for each of the plies, and a boundary for each of the plies, determining one or more subset regions on the tool model based on the boundaries from the ply coverage, creating a merged ply combining the plies and aligning the fiber orientations, defining staging instances of the merged ply for each ply covering a subset region, determining a laydown order of the staging instances, running a draping simulation using the laydown order to solve the staging instances, generating a flat pattern from the draping simulation, and storing the flat pattern of the composite ply.

20 Claims, 13 Drawing Sheets

(51) Int. Cl.
  *B29C 70/30*   (2006.01)
  *G06T 17/00*   (2006.01)
  *B29C 70/34*   (2006.01)
  *G06T 19/00*   (2011.01)

(56) References Cited

U.S. PATENT DOCUMENTS

| | | | | |
|---|---|---|---|---|
| 5,038,291 | A * | 8/1991 | Wang | B29C 70/30 345/420 |
| 5,984,511 | A * | 11/1999 | Vasey-Glandon | G06F 17/50 345/420 |
| 6,978,230 | B1 * | 12/2005 | Klosowski | G06T 17/20 345/420 |
| 7,010,472 | B1 * | 3/2006 | Vasey-Glandon | G06F 17/50 700/97 |
| 7,099,725 | B2 * | 8/2006 | Murrish | G06T 19/00 700/118 |
| 7,243,055 | B2 * | 7/2007 | Chen | B29C 70/30 345/420 |
| 7,369,976 | B1 * | 5/2008 | Nakajima | B60C 3/04 703/6 |
| 8,263,205 | B2 | 9/2012 | Kweder | |
| 8,315,837 | B2 * | 11/2012 | Martin Menayo | B29C 70/54 428/152 |
| 8,751,197 | B2 * | 6/2014 | Burgos Gallego | G06F 17/50 703/1 |
| 2005/0119774 | A1 * | 6/2005 | Murrish | G06T 19/00 700/98 |
| 2005/0163975 | A1 * | 7/2005 | Chen | B29C 70/30 428/192 |
| 2007/0244590 | A1 * | 10/2007 | Menayo | B29C 70/54 700/98 |
| 2010/0042243 | A1 * | 2/2010 | Burgos Gallego | G06F 17/50 700/98 |
| 2010/0106463 | A1 * | 4/2010 | Hindman | G06F 17/50 703/1 |
| 2010/0121625 | A1 * | 5/2010 | Krog | G06F 17/5004 703/6 |
| 2012/0109594 | A1 | 5/2012 | Grape et al. | |
| 2012/0197601 | A1 * | 8/2012 | Matsui | G06F 17/50 703/1 |
| 2013/0060368 | A1 | 3/2013 | Balkenende et al. | |
| 2013/0103359 | A1 * | 4/2013 | Grandine | G06F 17/5095 703/1 |
| 2013/0231902 | A1 | 9/2013 | Luby et al. | |
| 2014/1080653 | | 6/2014 | Belmans | |
| 2015/0106062 | A1 * | 4/2015 | Chen-Keat | G06F 17/50 703/1 |
| 2016/0140256 | A1 * | 5/2016 | Paavilainen | G06F 17/5009 703/1 |
| 2016/0179984 | A1 * | 6/2016 | Chen-Keat | G06T 17/00 703/1 |
| 2016/0217220 | A1 * | 7/2016 | Carrera | G06F 17/50 |

OTHER PUBLICATIONS

International Searching Authority, "International Search Report and Written Opinion of the International Searching Authority", Apr. 15, 2016, for PCT/US2016/014416.

* cited by examiner

200

210

205

215

300

305

400

405

500a

500b

500c

500d

805

810

800

825

820

815

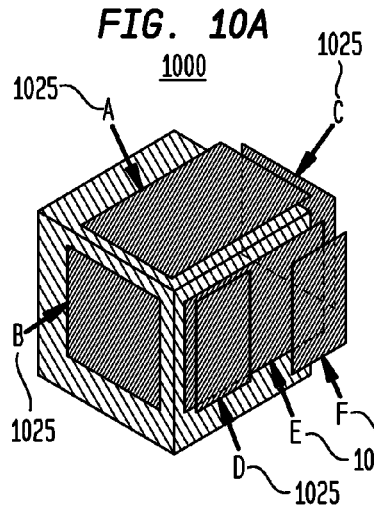
FIG. 10A
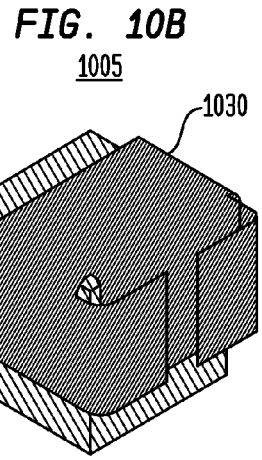
FIG. 10B
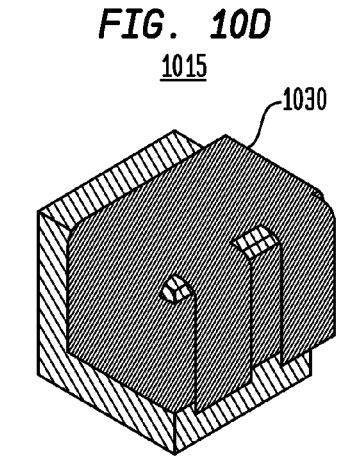
FIG. 10D
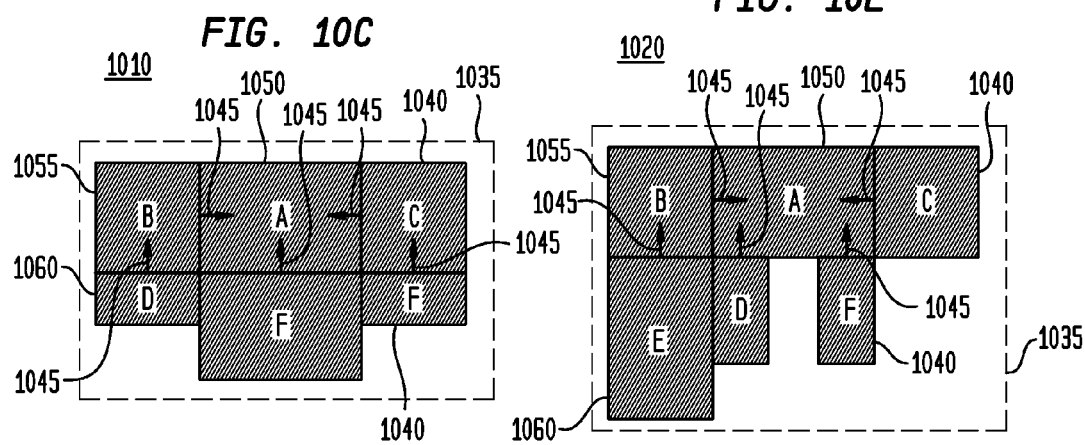
FIG. 10C
FIG. 10E
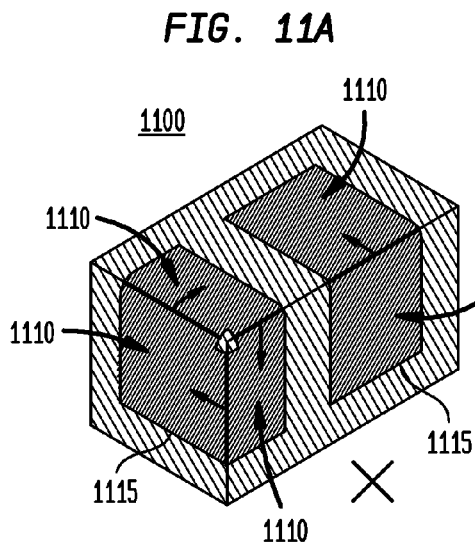
FIG. 11A
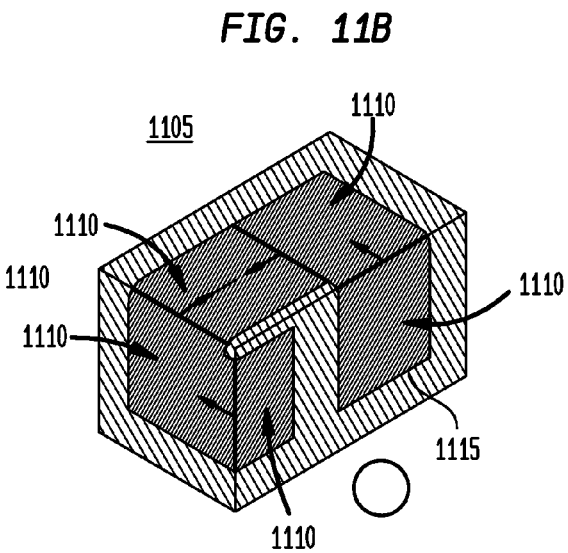
FIG. 11B

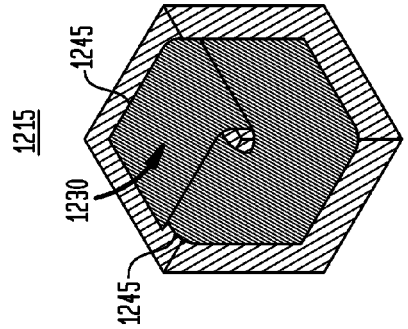
FIG. 12D
1215
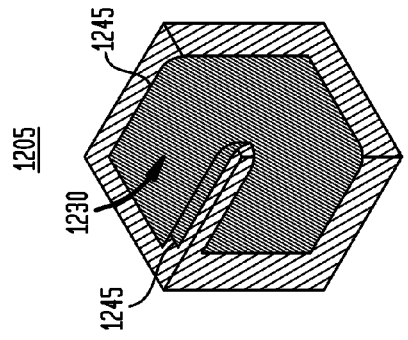
FIG. 12B
1205
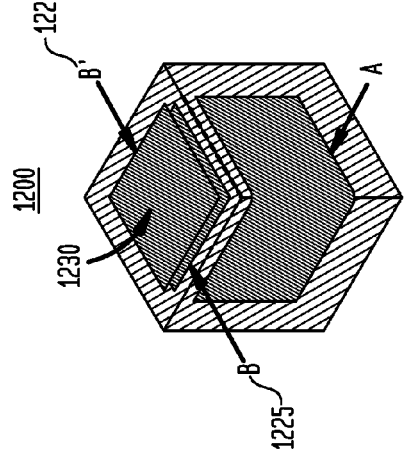
FIG. 12A
1200
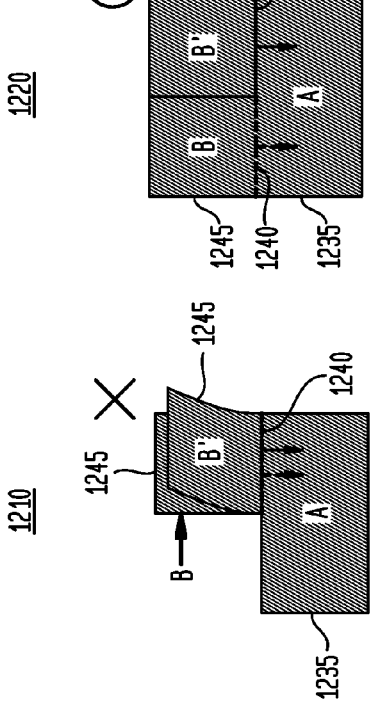
FIG. 12E
1220
FIG. 12C
1210

1300

1305

1310

1315

1320

1325

1330

1400

1405

1410

1415

1500

1505a

1505b

1505c

1505d

1505e

1600

1605a

1605b

1605c

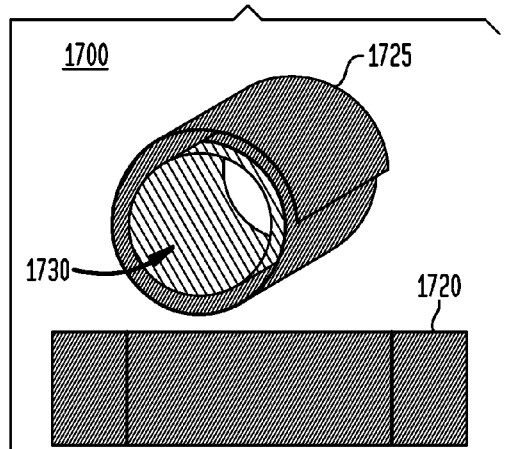
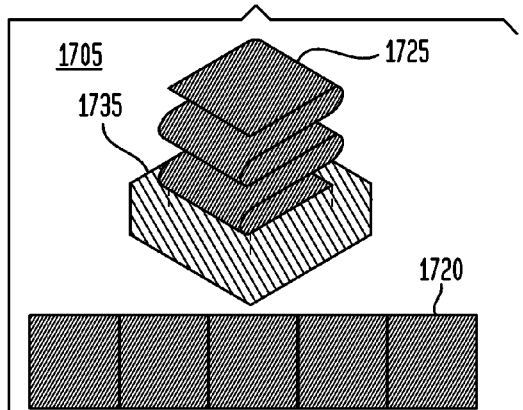
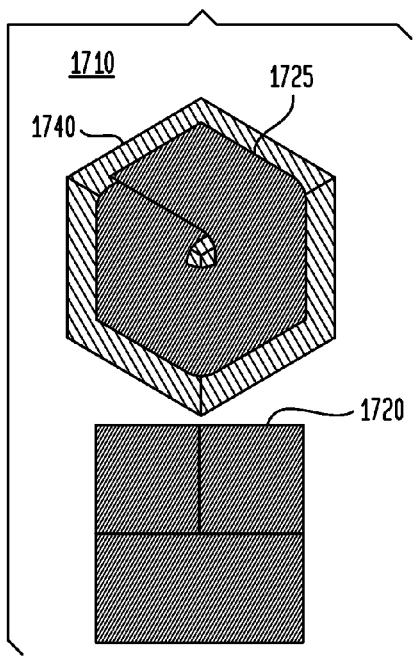
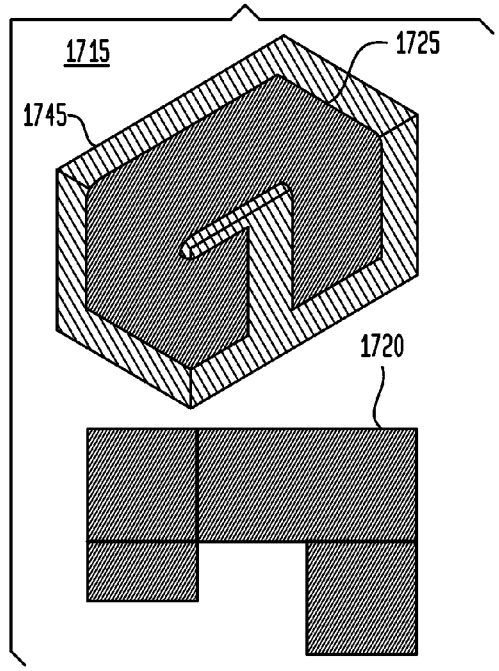
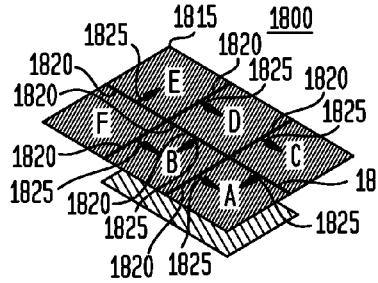
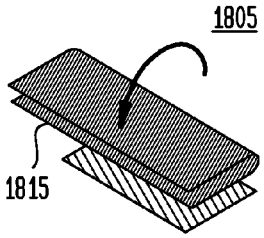
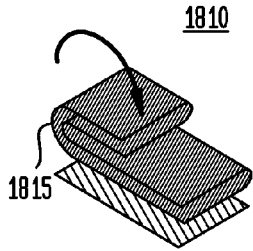

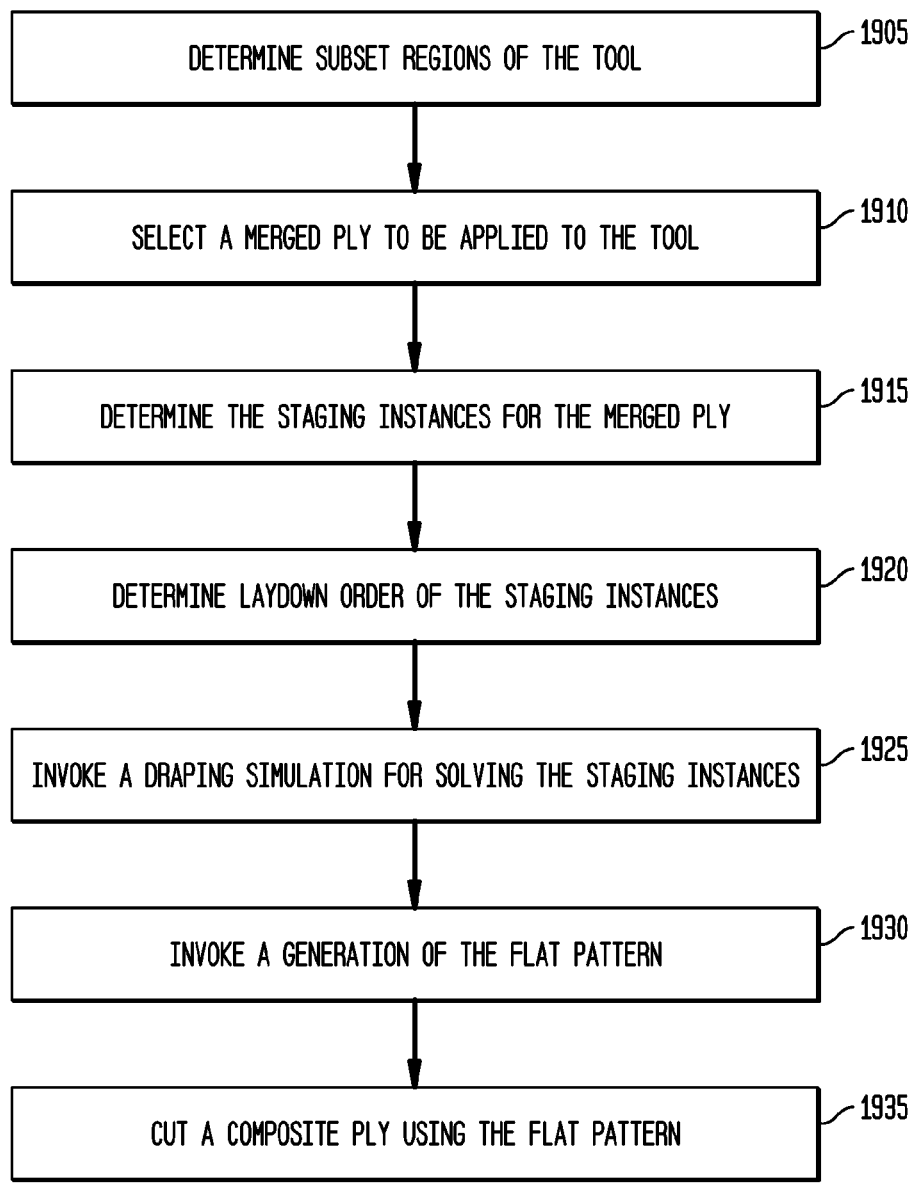

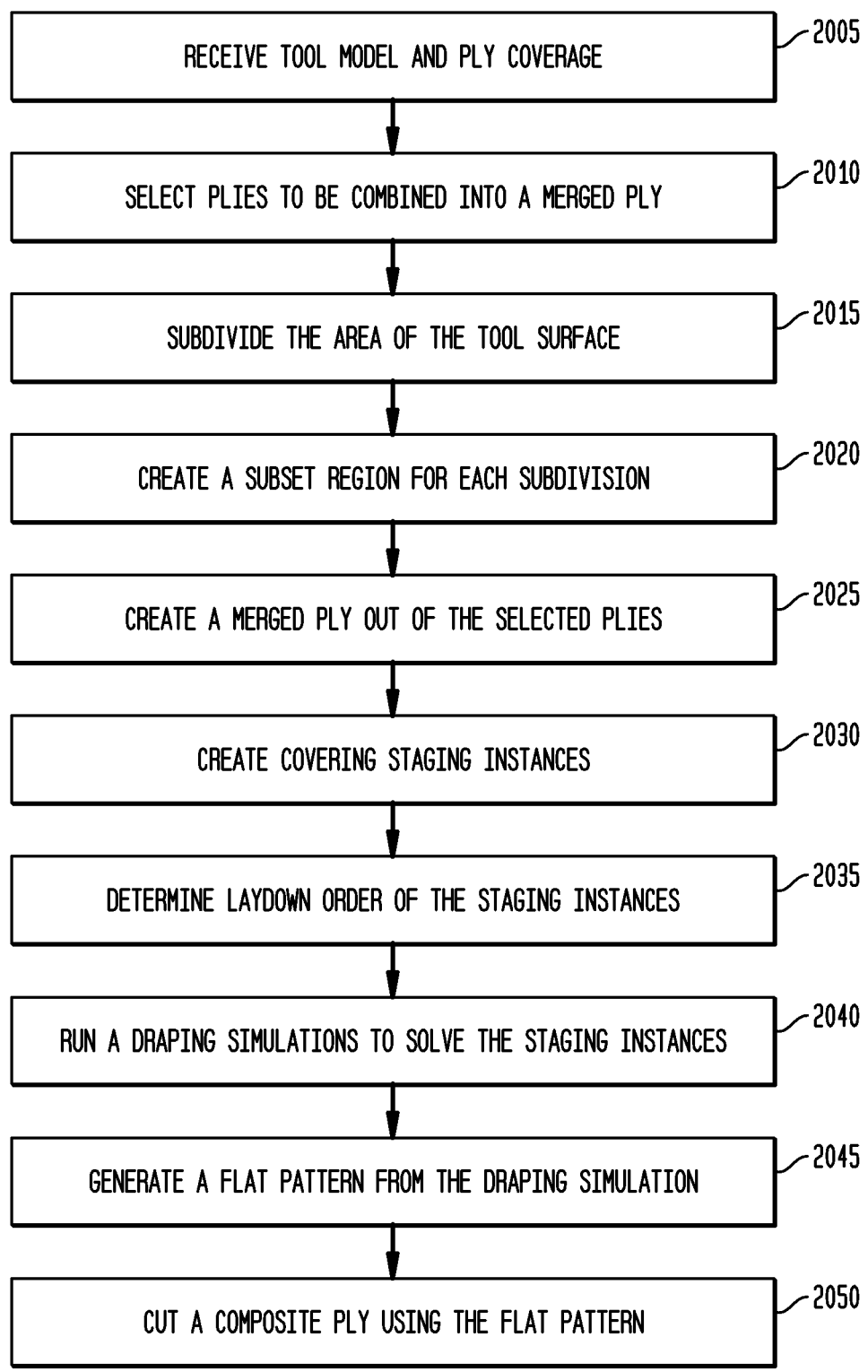

METHOD FOR REPRESENTING AND GENERATING A FLAT PATTERN FOR A COMPOSITE PLY THAT FOLDS OVER ITSELF

TECHNICAL FIELD

The present disclosure is directed, in general, to computer-aided design ("CAD"), visualization, and manufacturing systems, product lifecycle management ("PLM") systems, and similar systems, that manage data for products and other items (collectively, "Product Data Management" systems or PDM systems). Various embodiments are particularly related to CAD systems and processes for composite parts.

BACKGROUND OF THE DISCLOSURE

Product data management (PDM) systems manage product lifecycle management (PLM) systems and other data. Improved systems are desirable.

SUMMARY OF THE DISCLOSURE

Various disclosed embodiments include methods for generating a flat pattern for a composite ply. A method includes receiving a tool model and a ply coverage. The ply coverage defines a plurality of plies, a fiber orientation for each of the plies, and a boundary for each of the plies. The method further includes determining one or more subset regions on the tool model based on the boundaries from the ply coverage. The method further includes creating a merged ply combining the plies and aligning the orientations of the fibers. The method further includes defining staging instances of the merged ply for each ply covering a subset region. The method further includes determining a laydown order of the staging instances. The method further includes running a draping simulation using the laydown order to solve the staging instances. The method further includes generating a flat pattern from the draping simulation, and storing the flat pattern of the composite ply.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 10A-10E illustrate two examples of merged plies and the flat patterns for a set of six staging instances in accordance with disclosed embodiments;

FIG. 11A illustrates an invalid configuration of staging instances within a merged ply in accordance with disclosed embodiments;

FIG. 11B illustrates a valid configuration of the same staging instances within a merged ply in accordance with disclosed embodiments;

FIGS. 12A-12E illustrate a staging instances set merged into an invalid configuration with a flat pattern and a valid configuration with a flat pattern in accordance with disclosed embodiments;

FIGS. 17A-17D illustrate ply coverages of plies wrapped over different shapes and their corresponding flat patterns in accordance with disclosed embodiments.

FIGS. 18A-18C illustrate a draping simulation with a first fold and a second fold of the ply in accordance with disclosed embodiments;

FIG. 19 illustrates a flowchart of a process for creating a flat pattern for a wrapped or folded ply, for example, by a PLM or PDM system; and FIG. 20 illustrates a flowchart of another process for creating a flat pattern for a wrapped or folded ply, for example, by a PLM or PDM system.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Tubular-shaped mechanical parts made of composite materials laid down by hand typically include one or more full-coverage plies. Such full-coverage plies are laid down by wrapping them one or more times circumferentially around a tubular mandrel. The ply's end typically overlaps the start to compensate for the structural degradation induced by the fiber discontinuity at the ends of the wrap.

The manufacturing of a composite ply laid down by hand typically includes the generation of a flat pattern used to cut a sheet of composite material. A draping simulation is usually required to generate an accurate flat pattern, especially if the part geometry exhibits double curvature. Currently available commercial draping simulation systems simulate the draping of a whole ply at once or at most two stages in some cases. Furthermore, overlapping or folding of the ply in three-dimensional space is not supported by commercial systems, with the exception of an overlap over a short distance. Overlapping the ends of a wrapped ply is only a special case of folding a subset of a ply over already laid down subsets of the ply, which can be used to design box-type parts.

One advantage of being able to fold and define slits on a set of plies is that it enables the part to be "pre-formed" into a shape that is close to its final three-dimensional shape. Such "pre-forming" or near net-shaping of the part before curing eliminates fiber bunching and bridging during forming that would otherwise decrease the structural performance of the part. Enabling the use of pre-forming processes reduces the cost and time to manufacture composite parts, which is especially important for automobile manufacturers and other industries.

Disclosed embodiments describe a method for representing such folded composite plies and a method for generating a flat pattern for the same.

Figure 1:
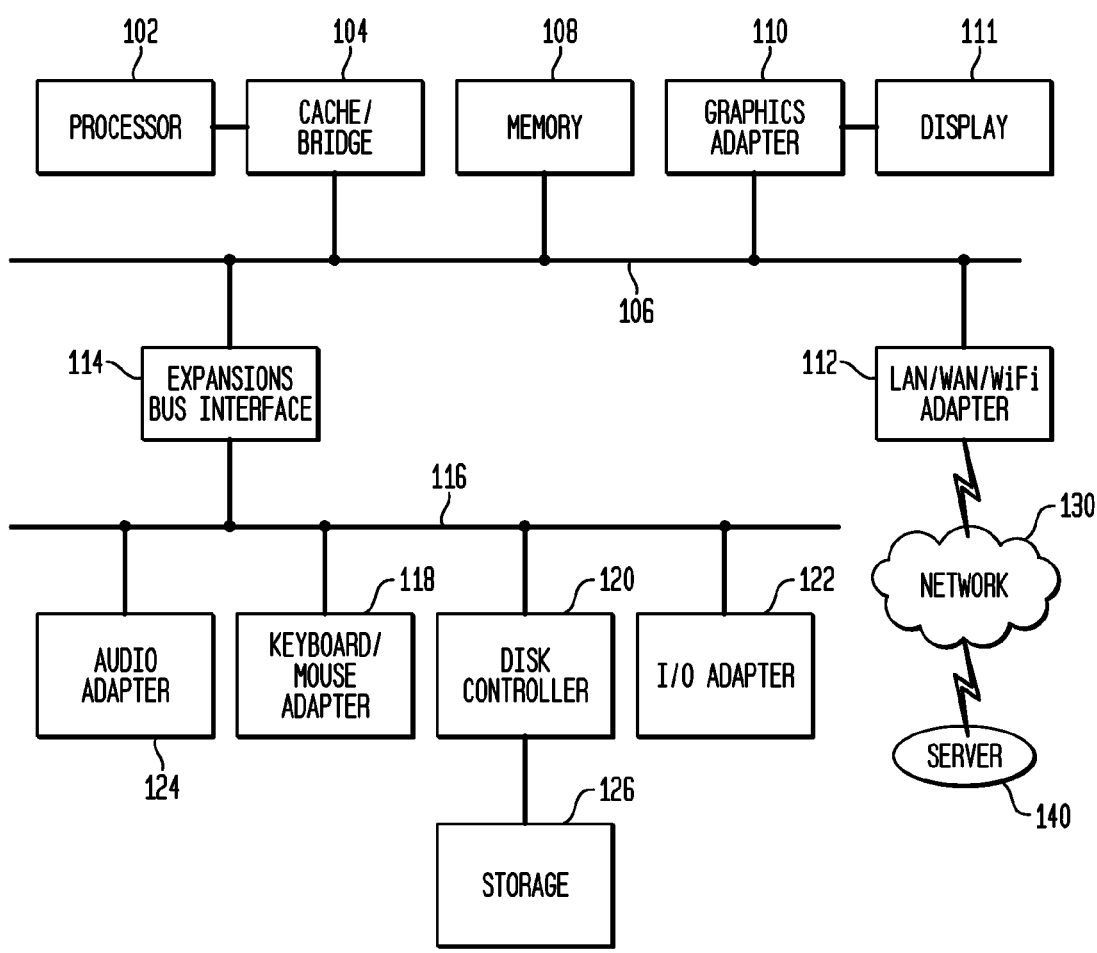
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2A:
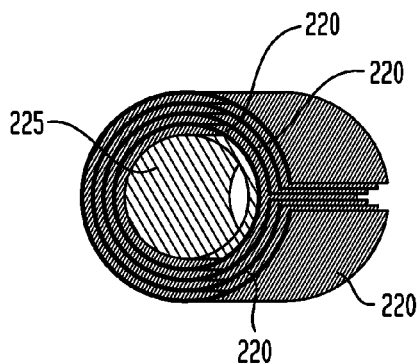
FIGS. 2A-2D illustrate two different ply coverages in accordance with disclosed embodiments.
Figure 2C:
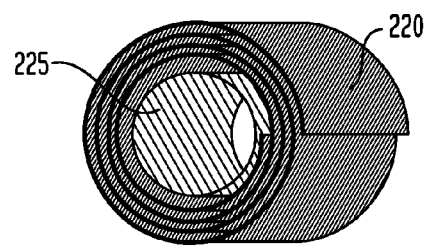
Figure 2B:
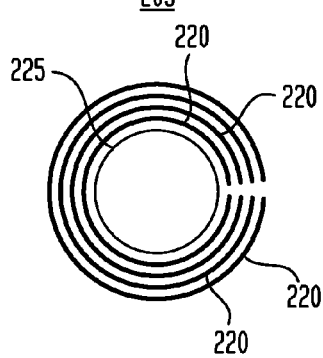
Figure 2D:
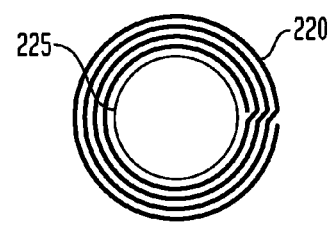

FIGS. 2A-2D illustrate two different ply coverages in accordance with disclosed embodiments. FIG. 2A illustrates ply coverage 200 with four separate plies 220 layered covering a mandrel tool 225. FIG. 2B illustrates a cross section 205 of the ply coverage 200 from FIG. 2A. FIG. 2C illustrates a ply coverage 210 with one continuous ply 220 wrapped around the mandrel tool 225 four times. FIG. 2D illustrates a cross section 215 of the ply coverage 210 from FIG. 2C. A "tool" 225, as used herein, refers to the laydown surface on which the composite plies will be laid down.

The composite part design process starts by importing ply coverage 200 or ply coverage 210, number of plies 220, and their materials, orientations and boundaries, from a finite element analysis (FEA). The composite part designer determines how to merge or splice plies 220 specified by the FEA to make the design manufacturable within cost and performance constraints.

For certain types of parts, merging plies 220 of same orientation and material is advantageous for laying down in a single manufacturing operation, for example, a ply 220 wrapped multiple times around a mandrel tool 225. The imported FEA data specifies a number of plies 220 to be wrapped around the mandrel tool 225, and a decision is made to merge those plies 220 into a single ply 220 wrapped a number of times around the mandrel tool 225.

Figure 3A:
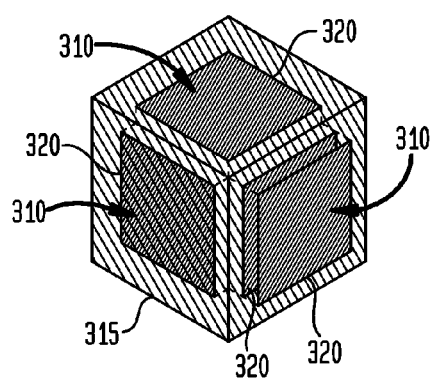
FIG. 3A illustrates an finite element analysis (FEA) ply coverage result for the areas of a cube tool requiring covering using plies in accordance with disclosed embodiments.
Figure 3B:
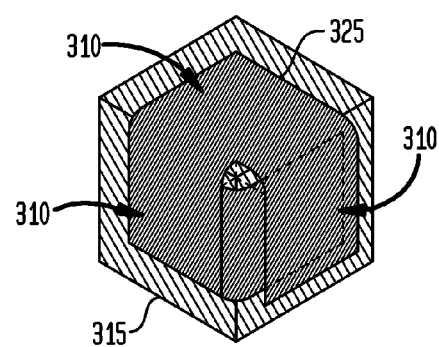
FIG. 3B illustrates an example of a merged ply result with a merged ply covering the areas of the cube shaped tool in accordance with disclosed embodiments.

FIG. 3A illustrates an FEA ply coverage result 300 for the areas 310 of a cube shaped tool 315 requiring covering using plies 320 in accordance with disclosed embodiments. FIG. 3B illustrates an example of a merged ply result 305 with a merged ply 325 covering the areas 310 of the cube shaped tool 315 in accordance with disclosed embodiments.

In the illustrated embodiment, the FEA ply coverage result 300 requires a ply 320 covering the three areas 310 forming a corner of a cube shaped tool 315, such that one of the areas 310 of the cube shaped tool 315 is covered twice. The imported FEA data specifies one ply 320 covering two of the areas 310 and two plies 320 covering the third area 310, and a decision is made to merge the four plies 320 into a single merged ply 325 folded over the corner such that one of the areas 310 is covered twice.

Figure 4A:
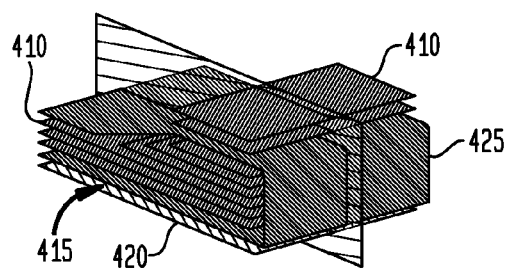
FIG. 4A illustrates a ply laydown in accordance with disclosed embodiments.
Figure 4B:
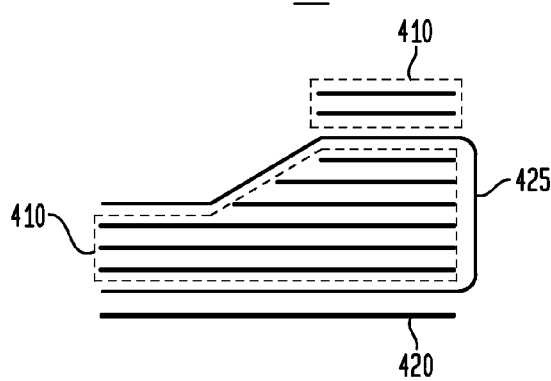
FIG. 4B illustrates a cross-section view of the ply laydown in accordance with disclosed embodiments.

FIG. 4A illustrates a ply laydown 400 and FIG. 4B illustrates a cross-section view 405 of the ply laydown 400 in accordance with disclosed embodiments. The ply laydown 400 represents the plies 410 covering an area 415 of the tool 420. The illustrated ply laydown 400 includes a number of single plies 410 inside and outside of a single merged ply 425.

The difficulty with wrapped or folded merged plies 425 is representing a single merged ply 425 appearing more than once in the composite ply laydown 400. Each appearance needs to be documented unambiguously in order for the shop floor operator to know which subset of the single merged ply 425 to lay down next.

Figure 5A:
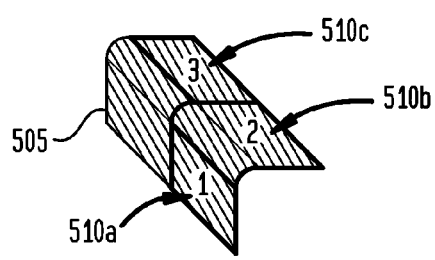
FIGS. 5A-5D illustrate a draping simulation in accordance with disclosed embodiments.
Figure 5B:
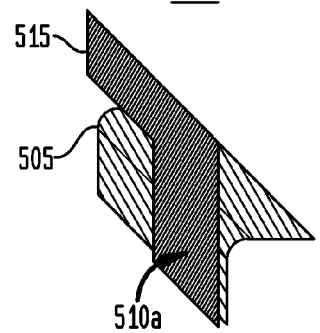
Figure 5C:
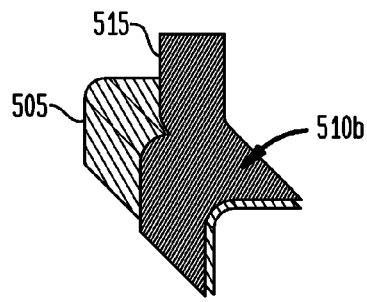
Figure 5D:
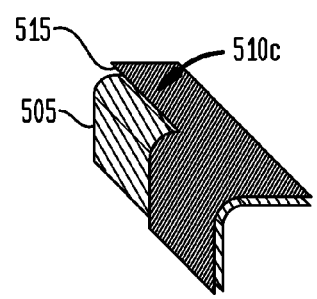

FIGS. 5A-5D illustrate a draping simulation 500a-500d in accordance with disclosed embodiments. FIG. 5A illustrates a tool surface 505 with three subset regions 510a-510c in accordance with disclosed embodiments. FIG. 5B illustrates a merged ply 515 covering the first subset region 510a in accordance with disclosed embodiments, FIG. 5C illustrates the merged ply 515 folded over the tool surface 505 covering the second subset region 510b in accordance with disclosed embodiments. FIG. 5D illustrates the merged ply 515 folded to cover the third subset region 510c in accordance with disclosed embodiments.

The draping simulation 500 used to generate the merged ply's flat pattern must reflect the lay down sequence for each subset region 510a-510c of the merged ply 515. The adjacency relationships between the subsets of the merged ply 515 determine the potential paths for propagating the draping simulation 500 across the whole merged ply 515. Additional information is needed to constrain the draping simulation 500 to propagate along a unique path across the whole merged ply 515. The draping simulation 500 of a given subset takes into account the thickness increase due to subsets already laid down beneath it. The draping simulation 500 of all subsets will be used to compute a single flat pattern for the merged ply 515. The draping simulation 500 is generalized to represent a merged ply 515 that is laid down one subset at a time instead of all at once, whether the merged ply 515 overlaps itself or not.

Figure 6A:
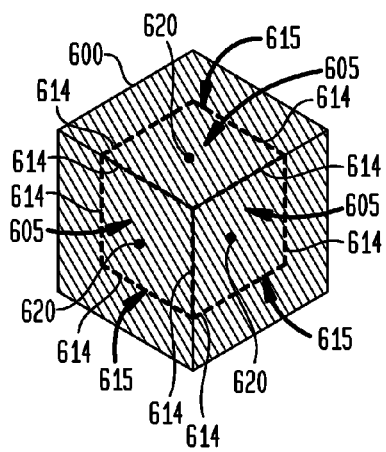
FIG. 6A illustrates a cube tool with defined subset regions in accordance with disclosed embodiments.
Figure 6B:
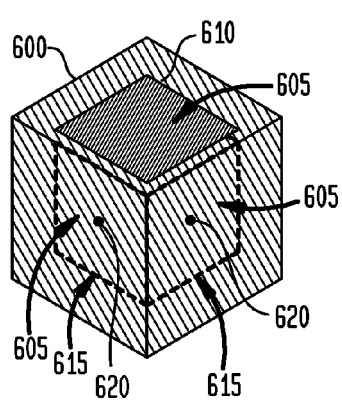
FIG. 6B illustrates the cube tool with a ply covering a single subset region in accordance with disclosed embodiments.
Figure 6C:
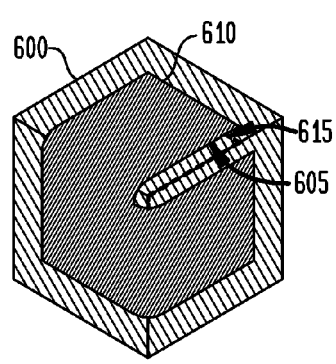
FIG. 6C illustrates a cube tool with a ply covering all the subset regions in accordance with disclosed embodiments.

FIG. 6A illustrates a cube tool 600 with defined subset regions 605 in accordance with disclosed embodiments. FIG. 6B illustrates the cube tool 600 with a ply 610 covering a single subset region 605 in accordance with disclosed embodiments. FIG. 6C illustrates a cube tool 600 with a ply 610 covering all the subset regions 605 in accordance with disclosed embodiments.

A subset region 605 defines areas where one or more plies 610 of material will be laid down on the tool. One or more curves 614 define the boundary 615 for each subset region 605 and an origin point 620 defines the inside of the boundary 615.

Figure 7A:
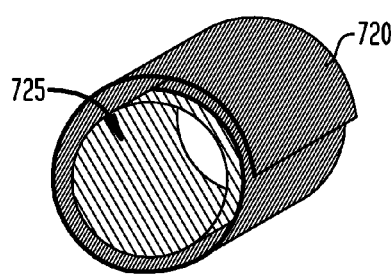
FIGS. 7A-7D illustrate two different ply laydown orders in accordance with disclosed embodiments.
Figure 7C:
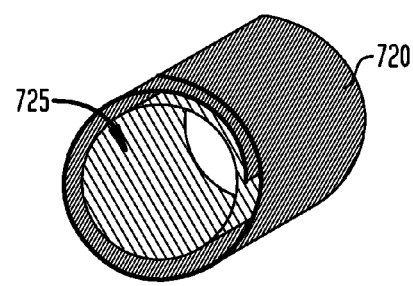
Figure 7B:
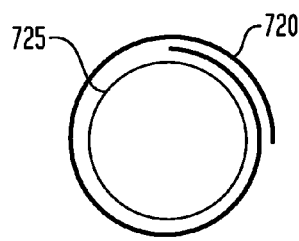
Figure 7D:
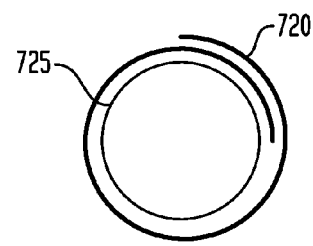

FIGS. 7A-7D illustrate two different ply laydown orders in accordance with disclosed embodiments. FIG. 7A illustrates a laydown order 700 with a merged ply 720 wrapped clockwise covering a mandrel tool 725. FIG. 7B illustrates a cross section 705 of the laydown order 700 from FIG. 7A. FIG. 7C illustrates a laydown order 710 with one merged ply 720 wrapped counter clockwise around the mandrel tool 725. FIG. 7D illustrates a cross section 715 of the laydown order 710 from FIG. 7C. Although the laydown order 700 and laydown order 710 are different, the merged plies 720 both cover the same subset regions on the mandrel tool 725.

Figure 8B:
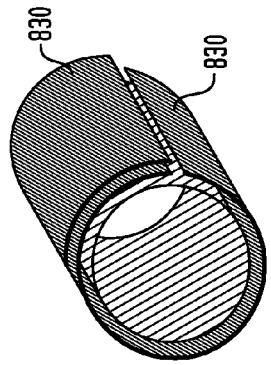
FIGS. 8A-8C illustrate a cylinder with a merged ply with multiply-covered subset regions and a merged ply with singly-covered subset regions in accordance with disclosed embodiments.
Figure 8C:
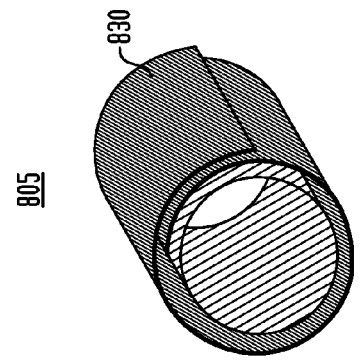
Figure 8A:
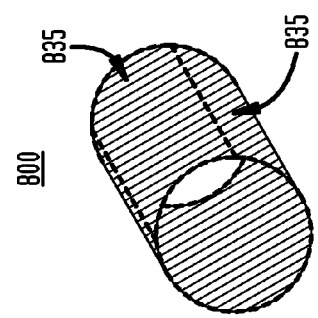
Figure 8F:
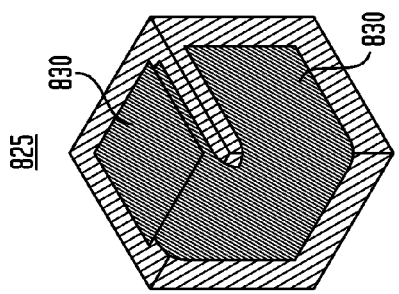
FIGS. 8D-8F illustrate a cube with a merged ply with multiply-covered subset regions and a merged ply with singly-covered subset regions in accordance with disclosed embodiments.
Figure 8E:
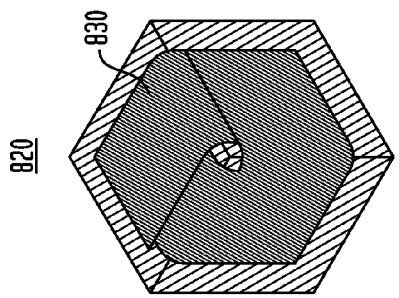
Figure 8D:
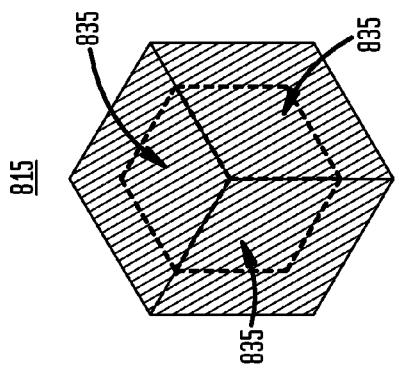

FIGS. 8A-8C illustrate a cylinder 800 with a merged ply with multiply-covered subset regions 805 and a merged ply with singly-covered subset regions 810 in accordance with disclosed embodiments. FIGS. 8D-8F illustrate a cube 815 with a merged ply with multiply-covered subset regions 820 and a merged ply with singly-covered subset regions 825 in accordance with disclosed embodiments.

One or more merged plies 830 represents a ply of material to be laid down on the tool, and allows for folding or wrapping of the material. A merged ply 830 has a material and a specified orientation, and covers the area of one or more subset regions 835. A merged ply 830 can cover a subset region 835 more than once, as is the case for folded and wrapped plies such as merged ply with multiply-covered subset regions 805 and merged ply with multiply-covered subset regions 820, and more than one merged ply 830 can cover a given subset region 835, such as merged ply with singly-covered subset regions 810 and merged ply with singly-covered subset regions 825.

Figure 9A:
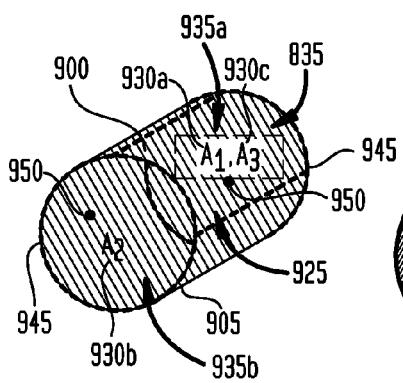
FIGS. 9A-9I illustrate staging instances on a cylinder, a cube, and a flat surface in accordance with disclosed embodiments.
Figure 9B:
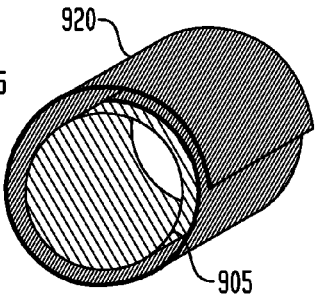
Figure 9C:
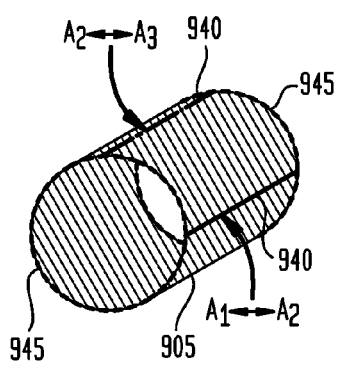

FIG. 9A-9I illustrates staging instances 900 on a cylinder 905, a cube 910, and a flat surface 915 in accordance with disclosed embodiments. A staging instance 900 represents an occurrence of the merged ply 920 covering a given subset region 925. FIG. 9A illustrates covering instances 930a-930c referencing covered subset 935a and 935b of the cylinder 905 in accordance with disclosed embodiments. FIG. 9B illustrates a merged ply 920 covering the cylinder 905 according to the covering instances 930a-930c in accordance with disclosed embodiments. FIG. 9C illustrates the fold lines 940 between the covering instances 930a-930c in accordance with disclosed embodiments.

Figure 9D:
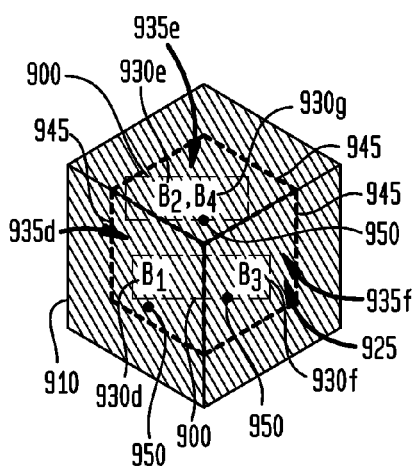
Figure 9E:
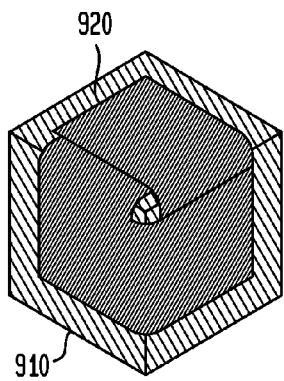
Figure 9F:
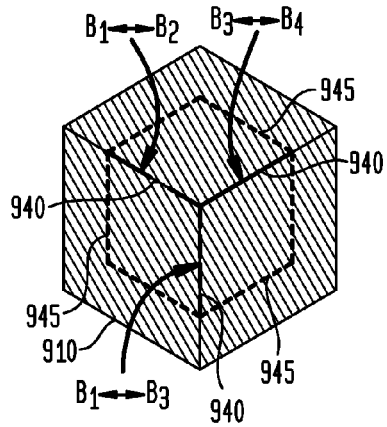

FIG. 9D illustrates covering instances 930d-930g referencing covered subset 935d-935e of the cube 910 in accordance with disclosed embodiments. FIG. 9E illustrates a merged ply 920 covering the cube 910 according to the covering instances 930d-930g in accordance with disclosed embodiments. FIG. 9F illustrates the fold lines 940 between the covering instances 930d-930g in accordance with disclosed embodiments.

Figure 9G:
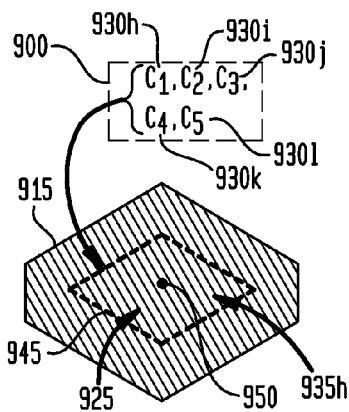
Figure 9H:
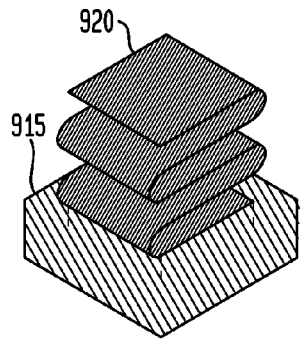
Figure 9I:
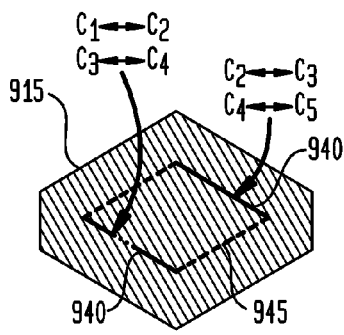

FIG. 9G illustrates covering instances 930h-930l referencing covered subset 935h on the flat surface 915 in accordance with disclosed embodiments. FIG. 9H illustrates a wrapped merged ply 920 covering the flat surface 915 according to the covering instances 930h-930l in accordance with disclosed embodiments. FIG. 9I illustrates the fold lines 940 between the covering instances 930h-930l in accordance with disclosed embodiments.

Each staging instance 900 references exactly one subset region 925, referred to as the covered subset 935. The staging instance 900 is referred to as a covering instance 930 of the subset region 925. A subset region 925 may have more than one covering instance 930, but each staging instance 900 has only one covered subset 935. The staging instance 900 has a boundary 945 and an origin 950, both of which it inherits from its covered subset 935. The staging instance 900 has a material and a specified orientation inherited from the merged ply 920.

For the cylinder 905, the covering instances 930a and 930c both reference covered subset 935a, while covering instance 930b references covered subset 935b. For the cube 910, the covering instance 930d references the covered subset 935d, the covering instances 930e and 930g reference the covered subset 935e, and the covering instance 930f references covered subset 935f. For the flat surface 915, the covering instances 930h-930l all reference the covered subset 935h.

The fold line 940 is a curve which will be a part or all of the overlap between the boundaries 945 of connected staging instances 900. The fold line 940 defines where the material connects the staging instances 900. The absence of a fold line 940 along the common boundary 945 of any two adjacent staging instances 900 indicates a material boundary 945 or slit. The fold lines 940 indicate which covering instances 930 are connected.

FIGS. 10A-10E illustrate two examples of merged plies and the flat patterns for a set of six staging instances in accordance with disclosed embodiments. FIG. 10A illustrates a configuration 1000 of six staging instances 1025 in accordance with disclosed embodiments. FIG. 10B illustrates an example of a merged ply 1005 with the six staging instances 1025 connected in accordance with disclosed embodiments. FIG. 10C illustrates the flat pattern 1010 of the merged ply 1005 in accordance with disclosed embodiments. FIG. 10D illustrates an example of an alternative merged ply 1015 with the six staging instances 1025 connected in accordance with disclosed embodiments. FIG. 10E illustrates the flat pattern 1020 of the alternative merged ply 1015 in accordance with disclosed embodiments.

The staging instances 1025 reference a merged ply, referred to as the parent 1030. A staging instance 1025 is referred to as child 1035 of that merged ply. A merged ply may have more than one child 1035, but each staging instance 1025 references only one parent 1030. Two staging instances 1025 that reference the same parent 1030 are referred to as siblings 1040.

The staging instance 1025 that precedes all of its siblings 1040 in the laydown order 1045 will be called the first child 1050 of the parent 1030. As used herein, the laydown order 1045 is the order the staging instances 1025 are laid down on the tool and is illustrated with arrows pointing at the constraint instance 1055. If the staging instance 1025 is not the first child 1050, it will reference one of its siblings 1040, referred to as the constraint instance 1055. The constraint instance 1055 precedes the referring instance 1060 in the laydown order 1045, and the boundary of the referring instance 1060 overlaps the boundary of the constraint instance 1055. A staging instance 1025 can be a constraint instance 1055 for more than one referring instance 1060. A staging instance 1025 cannot be its own constraint instance 1055.

FIG. 11A illustrates an invalid configuration 1100 of staging instances 1110 within a merged ply 1115 in accordance with disclosed embodiments. FIG. 11B illustrates a valid configuration 1105 of the same staging instances 1110 within a merged ply 1115 in accordance with disclosed embodiments. The valid configuration 1105 is designated with an "O" and the invalid configuration 1100 is designated with an "X."

All child staging instances 1110 of a given merged ply 1115 must be connected, such that for any staging instance 1110, a path can be traced by recursively traversing from the staging instance 1110 to its constraint instance, and said path will always end at the first child of the merged ply 1115. Invalid configuration 1100 is invalid because the staging instances 1110 form two separate merged plies 1115, or the constraint instances create two separate paths ending at different "first children." Invalid configuration 1100 is also invalid because of the circular reference of constraint instances, requiring one of the staging instances 1110 to reference a constraint instance that is later or subsequent in the laydown order.

FIGS. 12A-12E illustrate a staging instances set 1200 merged into an invalid configuration 1205 with a flat pattern 1210 and a valid configuration 1215 with a flat pattern 1220 in accordance with disclosed embodiments. The valid configuration 1215 is designated with an "O" and the invalid configuration 1205 is designated with an "X."

If a staging instance 1225 references the same covered subset 1230 as its constraint instance 1235, its fold line 1240 cannot be the entirety of the overlap of their boundaries resulting in a closed area. If two siblings 1245 reference the same covered subset 1230 and the same constraint instance 1235, the fold lines 1240 cannot overlap. The invalid configuration 1205 is invalid because the two siblings' 1245, B and B', fold lines 1240 overlap and they reference the same covered subset 1230 and the same constraint instance 1235, making the creation a flat pattern 1210 impossible.

FIGS. 13A-13G illustrate cross sections of valid and non-valid configurations for two sets of a staging instance with a constraint instance covering the same pair of subset regions in accordance with disclosed embodiments. The valid configurations are designated with an "O" and the invalid configurations are designated with an "X."

If two pairs of a staging instance and their constraint instances cover the same pair of distinct subset regions, the fold lines of the two pairs cannot overlap or the relative laydown order of the two pairs must be the same on each subset region. For example, given two pairs $\{A_1, A_2\}$ and $\{B_1, B_2\}$ such that $A_1$ and $B_1$ cover the first subset region and $A_2$ and $B_2$ cover the second subset region, if $A_1$ is after $B_1$ in laydown order then $A_2$ is also after $B_2$ in the laydown order.

Figure 13A:
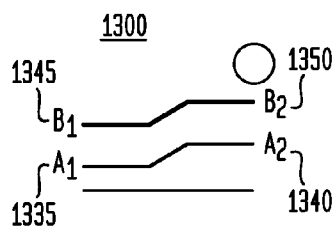
FIGS. 13A-13G illustrate valid and non-valid configurations for two sets of a staging instance with a constraint instance covering the same pair of subset regions in accordance with disclosed embodiments.
Figure 13B:
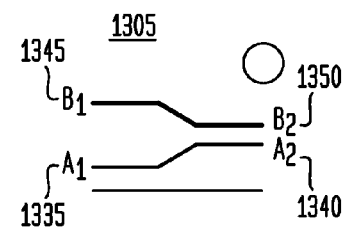
Figure 13C:
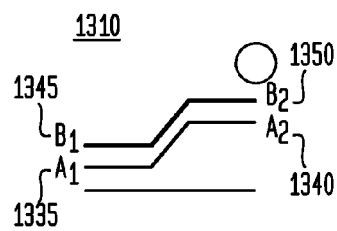

FIGS. 13A-13C illustrate cross sections of valid laydown orders in which the relative laydown order of the two pairs are the same on each subset region in accordance with disclosed embodiments. FIG. 13A illustrates a valid laydown order 1300 of $A_1$ 1335, $A_2$ 1340, $B_1$ 1345, and $B_2$ 1350. FIG. 13B illustrates a valid laydown order 1305 of $A_1$ 1335, $A_2$ 1340, $B_2$ 1350, and $B_1$ 1345. FIG. 13C illustrates a valid laydown order 1310 of $A_1$ 1335, $B_1$ 1345, $A_2$ 1340, and $B_2$ 1350.

Figure 13D:
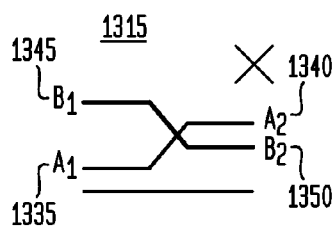
Figure 13E:
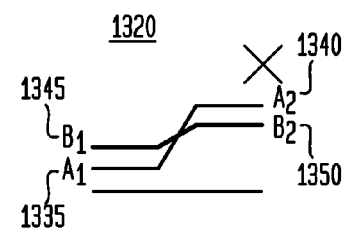
Figure 13F:
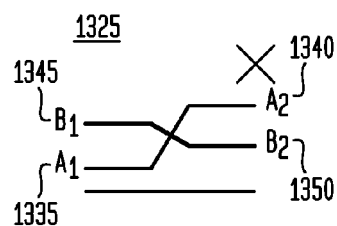

FIGS. 13D-13F illustrate cross sections of invalid laydown orders in which the fold lines overlap in accordance with disclosed embodiments. FIG. 13D illustrates an invalid laydown order 1315 of $A_1$ 1335, $B_2$ 1350, $A_2$ 1340, and $B_1$ 1345. FIG. 13E illustrates an invalid laydown order 1320 of $A_1$ 1335, $B_1$ 1345, $B_2$ 1350, and $A_2$ 1340. FIG. 13F illustrates an invalid laydown order 1325 of $A_1$ 1335, $B_2$ 1350, $B_1$ 1345, and $A_2$ 1340. Laydown order 1315, laydown order 1320, and laydown order 1325 are all invalid because the fold lines of the two pairs are configured to overlap for the laydown order and the relative laydown order of the two pairs are not the same on each subset region.

Figure 13G:
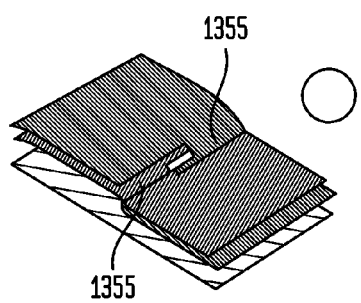

FIG. 13G illustrates a three dimensional valid laydown order 1330 where fold lines 1355 do not overlap in accordance with disclosed embodiments. The fold lines 1355 are only a portion of the boundaries between each pair of staging instances.

FIGS. 14A-14D illustrate cross-sections of valid and non-valid configurations for two sets of a staging instance with a constraint instance covering a single subset region in accordance with disclosed embodiments. The valid configurations are designated with an "O" and the invalid configuration is designated with an "X."

If two pairs of a staging instance and constraint instance all cover the same subset region, the fold lines of the two pairs must not overlap or the laydown order cannot alternate between the two pairs. For example, given two pairs called A and B, the laydown orders AABB, ABBA, BAAB, and BBAA are valid, and the laydown orders ABAB and BABA are not valid.

Figure 14A:
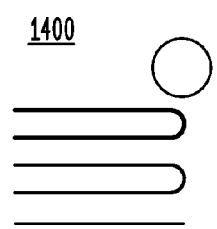
FIGS. 14A-14D illustrate cross-sections of valid and non-valid configurations for two sets of a staging instance with a constraint instance covering a single subset region in accordance with disclosed embodiments.
Figure 14B:
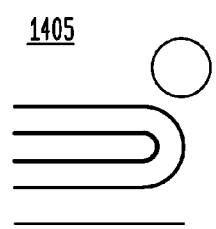
Figure 14C:
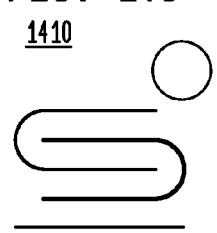
Figure 14D:
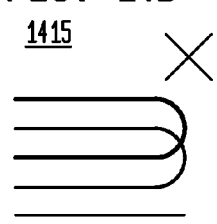

FIGS. 14A-14C illustrate cross sections of valid laydown orders in which the fold lines do not result in a collision of material in accordance with disclosed embodiments. FIG. 14A illustrates a valid laydown order 1400 of AABB that does not alternate between the two pairs in accordance with disclosed embodiments. FIG. 14B illustrates a valid laydown order 1405 of ABBA which also does not alternate between the pairs in accordance with disclosed embodiments. FIG. 14C illustrates a valid laydown order 1410 of ABAB that alternates between the two pairs, but the fold lines of the two pairs do not overlap in accordance with disclosed embodiment. FIG. 14D illustrates an invalid laydown order 1415 in which the fold lines overlap and the laydown order alternates between pairs in accordance with disclosed embodiments.

Figure 15A:
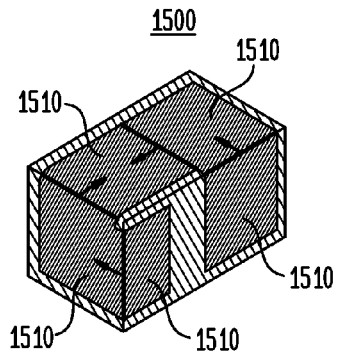
FIG. 15A illustrates a draping simulation in accordance with disclosed embodiments.
Figure 15B:
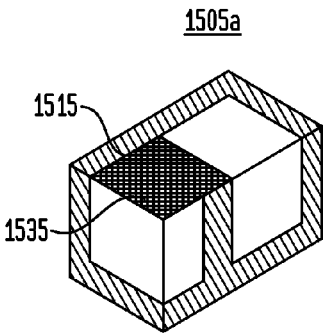
FIGS. 15B-15F illustrate each iteration of the draping simulation in accordance with disclosed embodiments.
Figure 15C:
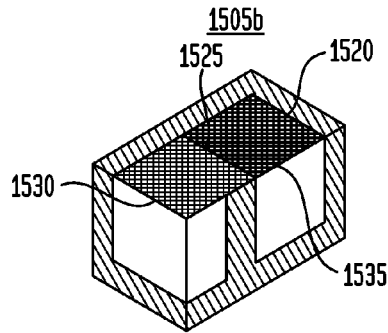
Figure 15D:
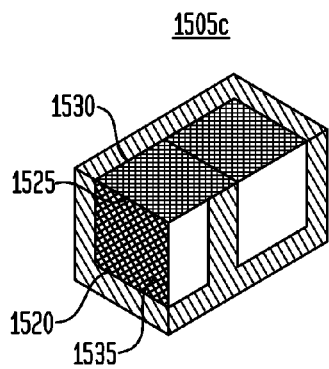
Figure 15E:
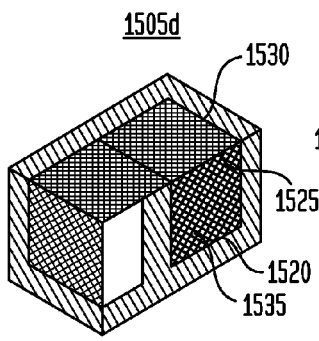
Figure 15F:
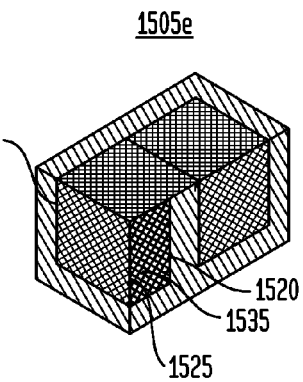

FIG. 15A illustrates a draping simulation 1500 in accordance with disclosed embodiments. FIGS. 15B-15F illustrate each iteration 1505a-1505e of the draping simulation 1500 in accordance with disclosed embodiments. The draping simulation 1500 is invoked after all staging instances 1510 are specified. The first iteration 1505a of the draping simulation 1500 solves the first child instance 1515. The draping simulation 1500 solves each referring instance 1520 following each iteration 1505b-1505e of the laydown order, propagating across the fold line curve 1525 to each staging instance 1510 from its constraint instance 1530. The fiber orientation 1535, illustrated as lines inside the staging instances 1510, are aligned at the fold lines.

Figure 16A:
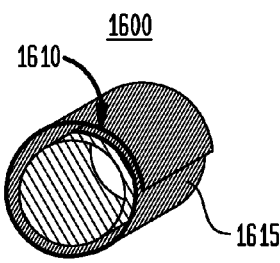
FIG. 16A illustrates a draping simulation with an overlap of the wrapped ply in accordance with disclosed embodiments.
Figure 16B:
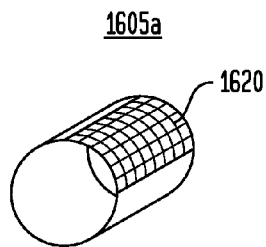
FIGS. 16B-16D illustrate each iteration of the draping simulation in accordance with disclosed embodiments.
Figure 16C:
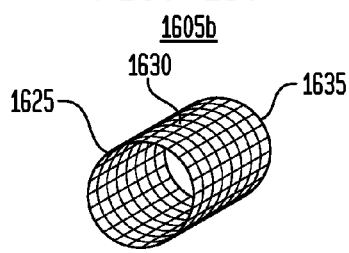
Figure 16D:
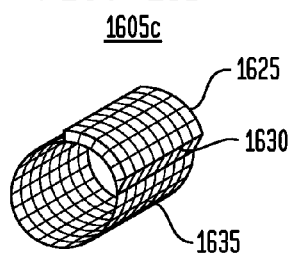

FIG. 16A illustrates a draping simulation 1600 with an overlap 1610 of the wrapped ply 1615 in accordance with disclosed embodiments. FIGS. 16B-16D illustrate each iteration 1605a-1605c of the draping simulation 1600 in accordance with disclosed embodiments. The first iteration 1605a of the draping simulation 1600 solves the first child instance 1620. The draping simulation 1600 solves each referring instance 1625 following each iteration 1605b and 1605c of the laydown order, propagating across the fold line curve 1630 to each staging instance from its constraint instance 1635. The draping simulation 1600 will take into account the thickness increase due to previously laid down staging instances.

FIGS. 17A-17D illustrate ply coverages of plies wrapped over different shapes and their corresponding flat patterns in accordance with disclosed embodiments. FIG. 17A illustrates a ply coverage 1700 of a flat pattern 1720 from a ply 1725 wrapped around a cylinder 1730 in accordance with disclosed embodiments. FIG. 17B illustrates a ply coverage 1705 of a flat pattern 1720 from a ply 1725 folded on a flat surface 1735 in accordance with disclosed embodiments. FIG. 17C illustrates a ply coverage 1710 of a flat pattern 1720 from a ply 1725 folded on a cube 1740 in accordance with disclosed embodiments. FIG. 17D illustrates a ply coverage 1715 of a flat pattern 1720 from a ply 1725 folded on a rectangular prism 1745 in accordance with disclosed embodiments.

FIGS. 18A-18C illustrate a draping simulation 1800 with a first fold 1805 and a second fold 1810 of the ply 1815 in accordance with disclosed embodiments. The fold lines 1820 are marked with an arrow indicating the laydown order 1825 and pointing towards the constraint instance for each staging instance. The first fold 1805 is performed along the fold lines 1820 between EF, BD, and AC. The second fold 1810 is performed along the fold lines 1820 between BF and DE. The staging instance D references both staging instance B and staging instance C. Similarly, the staging instance F references both staging instance B and staging instance E.

FIG. 19 illustrates a flowchart of a process for creating a flat pattern for a wrapped or folded ply 1900, for example, by a PLM or PDM system.

In step 1905, the system determines one or more subset regions of the tool. In certain embodiments, a user specifies the one or more subset regions. The subset regions define the areas where one or more plies of material are laid down on the tool. For each subset region, the user must specify one or more curves that define the boundary and an origin point that defines the inside of the boundary.

In step 1910, the system selects a merged ply to be applied to the tool. In certain embodiments, the user specifies one or more merged plies. The merged ply represents a ply of material to be laid down on the tool and includes folding or wrapping of the material. A merged ply includes a material and a specified orientation, and covers the area of one or more subset regions, as defined by its staging instances (described below with Step 1915). A merged ply can cover a subset region more than once, as in the case for folded or wrapped plies, and more than one merged ply can cover a given subset region.

In step 1915, the system determines the staging instances for the merged ply. In certain embodiments, the user specifies one or more staging instances for each merged ply. A staging instance represents an occurrence of the merged ply covering a given subset region. The staging instance references a merged ply, which is referred to as a parent. The staging instance is referred at as a child of that merged ply. A merged ply may have more than one child, but each staging instance has only one parent. Two staging instances that have the same parent are referred to as siblings.

The staging instance references exactly one subset region, which is referred to as the covered subsets. The staging instance is referred to as a covering instance of the subset region. A subset region can have more than one covering instance, but each staging instance includes only one covered subset. The staging instance is configured with a boundary and an origin, both inherited from the covered subset. The staging instance includes a material and a specified orientation of fibers, both inherited from the parent.

In step 1920 the system determines the laydown order of the staging instances. In certain embodiments, the user specifies the laydown order and the relationships between the staging instances, which determine how multiple staging instances are combined into a single merged ply. Each staging instance includes a laydown step defining the laydown order. The staging instance that precedes all of the siblings in the laydown order is referred to as the first child of the parent. A staging instance that constrains another staging instance is referred to as a constraint instance and the staging instance constrained by the constraint instance is referred to as a referencing instance. The constraint instance precedes the referencing instance in the laydown order, and the boundary of the referencing staging instance overlaps the boundary of the constraint instance. A staging instance can be a constraint instance for more than one referring instance, but a staging instance cannot be its own constraint instance.

If the staging instance is not the first child, the staging instance includes a curve, referred to as a fold line, which can be part or all of the overlap between the boundary of the staging instance and the boundary of the constraint instance. The fold line defines where the material is joined from the staging instance and the constraint instance. The absence of a fold line along the common boundary of any two adjacent staging instances indicates a material boundary or slit. All children of a given merged ply must be connected, such that a path can be traced by recursively traversing from the referencing instance to the constraint instance ending at the first child of the merged ply.

If a referencing instance lies on the same subset region as its constraint instance, the fold line may not be the entirety of the overlap of the boundaries, because referencing instance and the constraint instance would include the same boundary resulting in a closed area. If two siblings reference the same covered subset and the same constraint instance, their fold lines cannot overlap.

If two pairs of a staging instance and its constraint cover the same pair of distinct subset regions, at least one of the following two conditions must be satisfied in various embodiments: (1) The fold lines of the two pairs must not overlap OR (2) The relative laydown order of the two pairs must be the same on each subset region. For example, given two pairs $\{A_1, A_2\}$ and $\{B_1, B_2\}$ such that $A_1$ and $B_1$ cover the first subset region, and $A_2$ and $B_2$ cover the second subset region, if $A_1$ is after $B_1$ in laydown order then $A_2$ must be after $B_2$ in the laydown order.

Similarly, if two pairs of a referencing instance and a constraint instance all cover the same subset region, at least one of the following two conditions must be satisfied: (1) The fold lines of the two pairs must not overlap OR (2) The laydown order may not alternate between the two pairs. For example, given two pairs called A and B, the valid laydown orders are AABB, ABBA, BAAB, and BBAA. Laydown orders ABAB and BABA are not valid.

In step 1925, the system invokes a draping simulation for solving the staging instances. In certain embodiments, the user invokes the draping simulation after selection of all the staging instances. The draping simulation solves each staging instance following the laydown order, propagating across the fold line curve to each staging instance from the constraint instance. The draping simulation takes into account the thickness increase due to previously laid down stages.

In step 1930, the system invokes a generation of the flat pattern. In certain embodiments, the user can invoke the generation of the flat pattern once the simulation has completed solving all the stages. The system stores the flat pattern of the composite ply. In step 1935, the system cuts a composite ply using the flat pattern. The flat pattern is cut and laid on the tool according to the specified laydown order.

FIG. 20 illustrates a flowchart of an alternative process for creating a flat pattern for a wrapped or folded ply 2000, for example, by a PLM or PDM system.

In step 2005, the system receives a tool model and ply coverage. The ply coverage defines a plurality of plies and a material, an orientation of fibers, and a boundary for each of the plies. In certain embodiments, the user creates regular, non-merged plies using normal methods, including importing ply coverage from a finite element analysis. The finite element analysis can specify multiple layers of plies on a single surface of the tool.

In step 2010, the system selects plies to be combined into a merged ply. In certain embodiments, the user selects two or more plies. The merged ply is constrained to plies including the same material and fiber orientation. In the case of a cube corner, the plies can have orientations at 90 degrees to each other and can be combined into a merged ply that achieves the desired orientation after wrapping around the corner and overlapping. A portion of the boundaries of the selected plies overlap in a manner that each selected ply directly connects to at least one other selected ply. The selected plies also are all indirectly connected in a manner that a path along directly connected plies can connect any two selected plies.

In step 2015, the system subdivides the area of the tool surface based on the boundaries of the selected plies from the ply coverage. Each area is defined by the boundaries of the selected plies and referred to as a subdivision of the tool surface.

In Step 2020, the system creates a subset region for each subdivision of the tool surface. The boundary for a subset region is structured as the boundary of a respective subdivision of the tool surface.

In step 2025, the system creates a merged ply out of the selected plies. The merged ply represents a ply of material to be laid down on the tool and includes folding or wrapping of the material. The merged ply includes a material and a specified orientation, and covers the area of one or more subset regions, as defined by its staging instances (described below with Step 2030). A merged ply can cover a subset region more than once, as in the case for folded or wrapped plies, and more than one merged ply can cover a given subset region.

In step 2030, the system creates the covering staging instances for the merged ply. A staging instance represents an occurrence of the merged ply covering a given subset region. The number of covering staging instances equals the number of plies that lie on the tool surface subdivision from the boundary derived by the subset. The staging instance references a merged ply, which is referred to as a parent. The staging instance is referred at as a child of that merged ply. A merged ply may have more than one child, but each staging instance has only one parent. Two staging instances that have the same parent are referred to as siblings.

The staging instance references exactly one subset region, which is referred to as the covered subsets. The staging instance is referred to as a covering instance of the subset region. A subset region can have more than one covering instance, but each staging instance includes only one covered subset. The staging instance is configured with a boundary and an origin, both inherited from the covered subset. The staging instance includes a material and a specified orientation of fibers, both inherited from the parent. The steps 2005-2030 can be repeated for creation of any number of merged plies.

In step 2035, the system determines the laydown order and relationships of the staging instances. The laydown order determines how multiple staging instances are combined into a single merged ply. Each staging instance includes a laydown step defining the laydown order. The staging instance that precedes all of the siblings in the laydown order is referred to as the first child of the parent. A staging instance that constrains another staging instance is referred to as a constraint instance and the staging instance constrained by the constraint instance is referred to as a referencing instance. The constraint instance precedes the referencing instance in the laydown order, and the boundary of the referencing staging instance overlaps the boundary of the constraint instance. A staging instance can be a constraint instance for more than one referring instance, but a staging instance cannot be its own constraint instance.

If the staging instance is not the first child, the staging instance includes a curve, referred to as a fold line, which can be part or all of the overlap between the boundary of the staging instance and the boundary of the constraint instance. The fold line defines where the material is joined from the staging instance and the constraint instance. The absence of a fold line along the common boundary of any two adjacent staging instances indicates a material boundary or slit. All children of a given merged ply must be connected, such that a path can be traced by recursively traversing from the referencing instance to the constraint instance ending at the first child of the merged ply.

If a referencing instance lies on the same subset region as its constraint instance, the fold line may not be the entirety of the overlap of the boundaries, because referencing instance and the constraint instance would include the same boundary resulting in a closed area. If two siblings reference the same covered subset and the same constraint instance, their fold lines cannot overlap.

If two pairs of a staging instance and its constraint cover the same pair of distinct subset regions, at least one of the following two conditions must be satisfied: (1) the fold lines of the two pairs must not overlap OR (2) the relative laydown order of the two pairs must be the same on each subset region. For example, given two pairs $\{A_1, A_2\}$ and $\{B_1, B_2\}$ such that $A_1$ and $B_1$ cover the first subset region, and $A_2$ and $B_2$ cover the second subset region. If $A_1$ is after $B_1$ in laydown order, then $A_2$ must be after $B_2$ in the laydown order.

Similarly, if two pairs of a referencing instance and a constraint instance all cover the same subset region, at least one of the following two conditions must be satisfied: (1) the fold lines of the two pairs must not overlap OR (2) the laydown order may not alternate between the two pairs. For example, given two pairs called A and B, the valid laydown orders are AABB, ABBA, BAAB, and BBAA. Laydown orders ABAB and BABA are not valid.

In step 2040, the system runs the draping simulation for solving the staging instances. The draping simulation solves each staging instance following the laydown order, propagating across the fold line curve to each staging instance from the constraint instance. The draping simulation takes into account the thickness increase due to previously laid down stages.

In step 2045, the system generates the flat pattern with the solved staging instances of the draping simulation. In certain embodiments, the user can invoke the generation of the flat pattern once the simulation has completed solving all the stages. The system stores the flat pattern of the composite ply. In step 2050, the system cuts a composite ply using the flat pattern. The flat pattern is cut and laid on the tool according to the specified laydown order.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for generating a flat pattern for a composite ply, the method performed by a data processing system and comprising:
   receiving data defining a tool and a ply coverage, wherein the ply coverage defines a plurality of plies, a fiber orientation for each of the plies, and a boundary for each of the plies;
   determining one or more subset regions on the tool based on the boundaries from the ply coverage;
   creating at least one merged ply combining at least two of the plies and aligning the fiber orientations of the at least two of the plies;
   defining staging instances for each ply of the at least one merged ply which indicates the respective subset region that each respective ply covers such that the at least one merged ply is folded or is wrapped around a corner of the tool at the boundary between the at least two plies;
   determining a laydown order of the plies based on the staging instances;
   running a draping simulation using the laydown order to solve the staging instances, in which each ply of each staging instance is laid down at the respective subset region for each staging instance in the laydown order, which draping simulation takes into account thickness increase due to previously laid down plies;
   generating a flat pattern that defines a shape for cutting at least one composite ply corresponding to the at least one merged ply based on the draping simulation; and
   storing the flat pattern of the composite ply.

2. The method of claim 1, wherein the boundary for a ply is defined by one or more curves and an origin point.

3. The method of claim 1, wherein the staging instance is configured with the boundary inherited from a covered subset region.

4. The method of claim 1, wherein the merged ply comprises a fold line configured between the boundaries of a referring instance and a constraint instance, which constraint instance corresponds to a first one of the at least two plies of the at least one merged ply that is laid down in the laydown order prior to the referring instance which corresponds to a second one of the at least two plies of the at least one merged ply.

5. The method of claim 4, wherein the fold line is not all of the boundaries when the referring instance and the constraint instance cover a same subset region.

6. The method of claim 4, wherein the fold line does not overlap when sibling instances corresponding to two referring instances cover a same subset region and reference a same constraint instance.

7. The method of claim 1, wherein the staging instances are connected to trace back to a first child corresponding to a first one of the at least two plies that is laid down in the laydown order.

8. A data processing system comprising:
   a processor; and
   an accessible memory, the data processing system particularly configured to:
      receive data defining a tool and a ply coverage, wherein the ply coverage defines a plurality of plies, a fiber orientation for each of the plies, and a boundary for each of the plies;
      determine one or more subset regions on the tool based on the boundaries from the ply coverage;
      create at least one merged ply combining at least two of the plies and aligning the fiber orientations of the at least two of the plies;
      define staging instances for each ply of the at least one merged ply which indicates the respective subset region that each respective ply covers such that the at least one merged ply is folded or is wrapped around a corner of the tool at the boundary between the at least two plies;
      determine a laydown order of the plies based on the staging instances;
      run a draping simulation using the laydown order to solve the staging instances, in which each ply of each staging instance is laid down at the respective subset region for each staging instance in the laydown order, which draping simulation takes into account thickness increase due to previously laid down plies;
      generate a flat pattern that defines a shape for cutting at least one composite ply corresponding to the at least one merged ply based on the draping simulation; and
      store the flat pattern of the composite ply.

9. The data processing system of claim 8, wherein the boundary for a ply is defined by one or more curves and an origin point.

10. The data processing system of claim 8, wherein the staging instance is configured with the boundary inherited from a covered subset region.

11. The data processing system of claim 8, wherein the merged ply comprises a fold line configured between the boundaries of a referring instance and a constraint instance, which constraint instance corresponds to a first one of the at least two plies of the at least one merged ply that is laid down in the laydown order prior to the referring instance which corresponds to a second one of the at least two plies of the at least one merged ply.

12. The data processing system of claim 11, wherein the fold line is not all of the boundaries when the referring instance and the constraint instance cover a same subset region.

13. The data processing system of claim 11, wherein the fold line does not overlap when sibling instances corresponding to two referring instances cover a same subset region and reference a same constraint instance.

14. The data processing system of claim 8, wherein the staging instances are connected to trace back to a first child corresponding to a first one of the at least two plies that is laid down in the laydown order.

15. A non-transitory computer-readable medium encoded with executable instructions that, when executed, cause one or more data processing systems to:
   receive data defining a tool and a ply coverage, wherein the ply coverage defines a plurality of plies, a fiber orientation for each of the plies, and a boundary for each of the plies;
   determine one or more subset regions on the tool based on the boundaries from the ply coverage;
   create at least one merged ply combining at least two of the plies and aligning the fiber orientations of the at least two of the plies;
   define staging instances for each ply of the at least one merged ply which indicates the respective a subset region that each respective ply covers such that the at least one merged ply is folded or is wrapped around a corner of the tool at the boundary between the at least two plies;

determine a laydown order of the plies based on the staging instances;

run a draping simulation using the laydown order to solve the staging instances, in which each ply of each staging instance is laid down at the respective subset region for each staging instance in the laydown order, which draping simulation takes into account thickness increase due to previously laid down plies;

generate a flat pattern that defines a shape for cutting at least one composite ply corresponding to the at least one merged ply based on the draping simulation; and store the flat pattern of the composite ply.

16. The computer-readable medium of claim 15, wherein the boundary for a ply is defined by one or more curves and an origin point.

17. The computer-readable medium of claim 15, wherein the staging instance is configured with the boundary inherited from a covered subset region.

18. The computer-readable medium of claim 15, wherein the merged ply comprises a fold line configured between the boundaries of a referring instance and a constraint instance, which constraint instance corresponds to a first one of the at least two plies of the at least one merged ply that is laid down in the laydown order prior to the referring instance which corresponds to a second one of the at least two plies of the at least one merged ply.

19. The computer-readable medium of claim 18, wherein the fold line is not all of the boundaries when the referring instance and the constraint instance cover a same subset region.

20. The computer-readable medium of claim 18, wherein the fold line does not overlap when sibling instances corresponding to two referring instances cover a same subset region and reference a same constraint instance.

* * * * *